United States Patent

[11] 3,619,387

| [72] | Inventors | Wolfgang Friedrich Hermann Mindt<br>Dornach, Switzerland;<br>George Ignatius Parisi, Murray Hill, N.J. |
|---|---|---|
| [21] | Appl. No. | 6,166 |
| [22] | Filed | Jan. 27, 1970 |
| [45] | Patented | Nov. 9, 1971 |
| [73] | Assignee | Bell Telephone Laboratories, Incorporated<br>Murray Hill, Berkeley Heights, N.J.<br>Continuation-in-part of application Ser. No.<br>843,920, July 23, 1969, now abandoned. |

[54] TECHNIQUE FOR THE FABRICATION OF THIN FILM CAPACITOR INCLUDING LEAD DIOXIDE CONDUCTIVE FILMS
6 Claims, 6 Drawing Figs.

[52] U.S. Cl. .................................................... 204/38 A,
117/217, 317/230

[51] Int. Cl. ............................................... C23f 17/00,
C23f 9/00
[50] Field of Search ............................................ 204/38 A;
117/217; 317/230

[56] References Cited
UNITED STATES PATENTS

| 3,466,230 | 9/1969 | Carithers ..................... | 204/56 R |
| 3,415,722 | 12/1968 | Scheller et al ................ | 204/56 R |

Primary Examiner—John H. Mack
Assistant Examiner—R. L. Andrews
Attorneys—R. J. Guenther and Edwin B. Cave ABSTRACT: Lead dioxide films are deposited upon a substrate with mechanical properties such as to permit fabrication of capacitors in which they are used as the solid electrolyte over a metal oxide dielectric. The lead dioxide is produced by the oxidation of a divalent lead compound in solution by means of a persulfate.

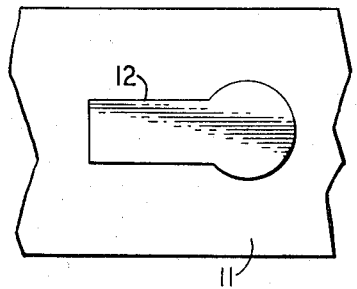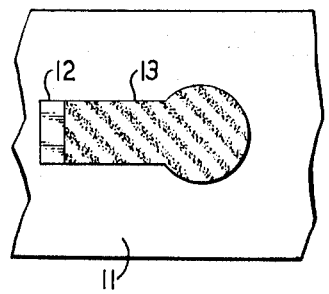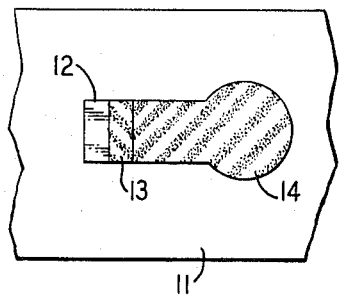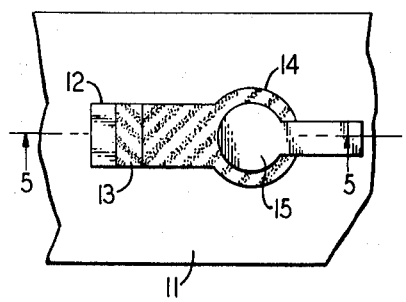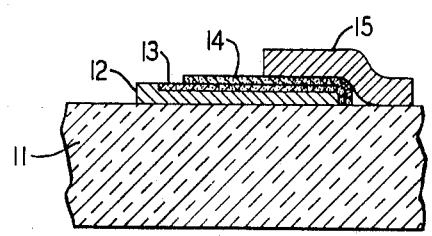

3,619,387

TECHNIQUE FOR THE FABRICATION OF THIN FILM CAPACITOR INCLUDING LEAD DIOXIDE CONDUCTIVE FILMS

This application is a continuation-in-part of copending application Ser. No. 843,920, filed July 23, 1969 now abandoned.

FIELD OF THE INVENTION

This invention relates to methods of depositing adherent layers of lead dioxide on substrates and particularly to the deposition of such layers to act as the solid electrolyte in the fabrication of solid electrolytic capacitors.

DESCRIPTION OF THE PRIOR ART

Although the theoretical possibility had long been recognized that the high capacity per unit dielectric area exhibited by wet electrolytic capacitors might be achieved in capacitors using similarly produced metal oxide dielectrics but omitting the inconvenient ionic electrolytes, the first commercially successful capacitors of the latter type were based upon the technique described in U.S. Pat. Nos. 3,093,883 and 3,166,693, issued June 18, 1963 and Jan. 19, 1965 to Haring and Taylor. This commercially practiced technique involves the formation of a semiconductive manganese dioxide layer, often termed a solid electrolyte, over an anodically produced dielectric oxide film on an electrode of a film-forming metal, usually tantalum; the counterelectrode is completed by producing a metal layer over the manganese dioxide layer, usually with the interposition of a graphite layer.

Earlier attempts to produce a capacitor of similar structure, in which lead dioxide was used as the solid electrolyte in place of manganese dioxide over the dielectric oxide film (U.S. Pat. No. 1,906,691 to Lilienfeld; U.S. Pat. No. 3,066,247 to Robinson) did not lead to commercially acceptable products.

It was later demonstrated by Berry (U.S. Pat. 2,993,266, issued July 25, 1961) that capacitors could be produced successfully by anodizing a tantalum electrode to produce a tantalum oxide dielectric film and then depositing a metal counterelectrode directly over the tantalum oxide, without an intermediate layer of manganese dioxide, by using as the initial tantalum electrode a sputtered tantalum film on a dielectric substrate. Even with such capacitors, often referred to as thin film capacitors, better yields can be obtained, especially for capacitors of larger surface areas, by interposing the layer of manganese dioxide. The capacitors with the manganese dioxide layer, however, exhibit a substantially higher dissipation factor because of the series resistance introduced by the resistivity of the manganese dioxide, a condition which may restrict their use for certain applications.

Because of the considerably higher electrical conductivity of lead dioxide, this problem of series resistance could be mitigated by the development of a successful method for depositing a layer of lead dioxide of adequate physical properties to replace the manganese dioxide layer in capacitors of either the thin film type or the bulk metal electrode type. Prior art attempts to produce capacitors in this way were unsuccessful because of the difficulty of depositing lead dioxide in (a) adherent layers, (b) film form, or (c) continuous and uniform layers.

BRIEF SUMMARY OF THE INVENTION

According to the present invention, lead dioxide films are deposited on a substrate with mechanical properties such as to permit the fabrication of capacitors in which they are used as the solid electrolyte over the metal oxide dielectric. Such capacitors have a lower series resistance than similar capacitors in which manganese dioxide is used. Thin film capacitors made with these lead dioxide films are obtainable in higher yield than similar capacitors in which the metal counterelectrode is deposited directly on the dielectric oxide.

The lead dioxide is produced by the oxidation of a divalent lead compound in solution by means of a persulfate. The carrying out of such a reaction in the presence of a substrate surface will ordinarily result primarily in the precipitation of lead dioxide in the bulk of the solution with no consistent deposit on the surface. It has been found, however, that if silver ions are present when the surface of the substrate is exposed to such a solution having a slightly acid pH, an initial adherent deposit of lead dioxide will be formed on the surface. Thereafter, the deposit of lead dioxide can be built up by further exposing the initially coated substrate surface to a second solution identical to that previously employed. The procedure of repetitive exposure to such solutions is then continued until the desired thickness is attained. Alternatively, the lead dioxide can be built up by exposing the initially coated substrate surface to such a solution (as employed previously) having a somewhat alkaline pH. In this procedure, once the initial coating has been formed, the second deposition step will proceed satisfactorily without the presence of silver ions in the solution.

For purposes of exposition, the present invention has been described largely in terms of printed capacitors. However, it will be appreciated by those skilled in the art that the described technique may also be employed in the fabrication of solid electrolytic capacitors utilizing, for example, foils, wound wires or porous bodies of the film-forming metal.

BRIEF DESCRIPTION OF THE DRAWINGS

The invention will be more readily understood by reference to the following detailed description taken in conjunction with the accompanying drawings wherein:

FIG. 1 is a plan view of a substrate with a layer of a film-forming metal deposited thereon;

FIG. 2 is a plan view of the body of FIG. 1 after anodization;

FIG. 3 is a plan view of the body of FIG. 2 after the deposition thereon of a coating of lead dioxide;

FIG. 4 is a plan view of the body of FIG. 3 after the deposition thereon of a counterelectrode;

FIG. 5 is a cross-sectional view of the body of FIG. 4; and

DETAILED DESCRIPTION

Figure 6:
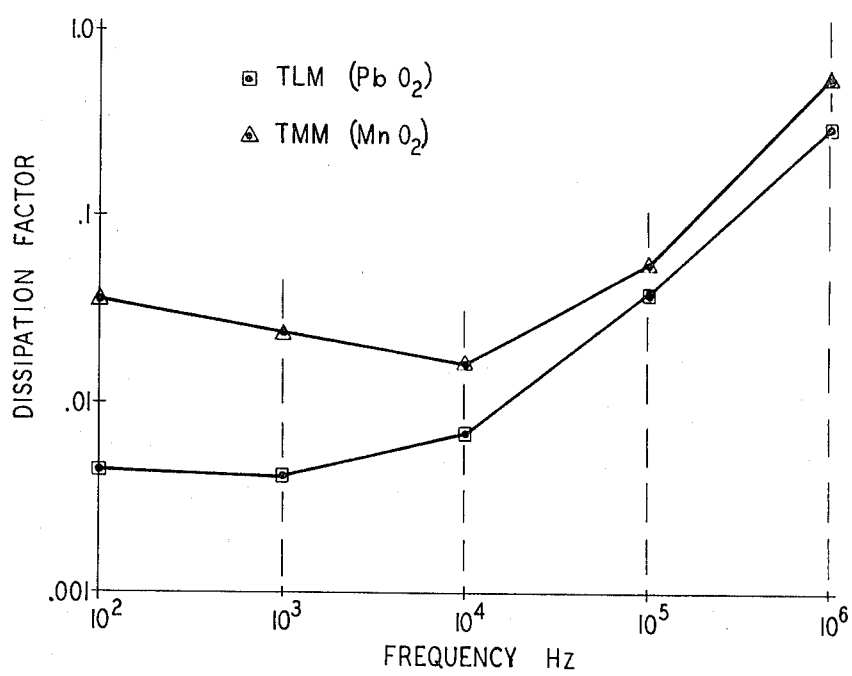
FIG. 6 is a graphical representation on coordinates of dissipation factor against frequency showing variations in dissipation factor as a function of frequency.

With further reference now to FIG. 1, there is shown a substrate 11 upon which a metallic pattern is to be produced in accordance with the present invention. The substrate material employed may be rough in nature and evidence sharp changes in contour or may be any of the conventional smooth surface substrate materials commonly employed in capacitor fabrication. Preferred substrate materials are glasses, ceramics, etc.

The first step in fabricating a thin film capacitor in accordance with the inventive technique involves cleaning substrate 11 by conventional techniques well known to those skilled in the art. Following the cleaning step, a layer of a film-forming metal 12 is deposited upon substrate 11 by conventional procedures as, for example, cathodic sputtering, vacuum evaporation, etc., as described by L. Holland in "Vacuum Deposition of Thin Films," John Wiley & Sons, 1956. The film-forming metals of interest herein are those whose oxides are known to be excellent dielectric materials and include tantalum, aluminum, niobium, titanium and zirconium.

For the purposes of the present invention, the minimum thickness of the layer deposited upon the substrate is dependent upon two factors. The first of these is the thickness of the metal which is converted into the oxide form during the subsequent anodizing step. The second factor is the minimum thickness of unoxidized metal remaining after anodization commensurate with the maximum resistance which can be tolerated in the film-forming electrode. It has been determined that the preferred minimum thickness of the metal electrode is approximately 3,000 angstroms.

Following, film-forming metal layer 12 is anodized in an appropriate anodizing electrolyte such as citric acid, phosphoric acid and the like to produce an oxide film 13 shown in FIG. 2.

The next step in the fabrication of a capacitor in accordance with the invention involves depositing a layer of lead dioxide 14 upon anodic oxide layer 13, as shown in FIG. 3.

As indicated above, the lead dioxide may be deposited in a series of repetitive exposures to acid solutions comprising a divalent lead compound, a persulfate and silver ions or in the alternative in a two-stage process involving initial exposure to the noted acid solution and subsequent exposure to an alkaline solution comprising a divalent lead compound and a persulfate.

In both procedures, the first step involves nucleating a lead dioxide film upon oxide layer 13. This is accomplished by permitting a solution comprising ammonium acetate of a molarity within the range of 1-8, lead acetate of a molarity within the range of 0.1-1 and a soluble silver salt of a molarity within the range of $5\times10^{15}$ to $5\times10^{14}$, manifesting a pH within the range of 5.0-6.9 (optimum = 6.0), to react with a solution of a material selected from the group consisting of the persulfates of sodium, potassium and ammonium of a molarity within the range of 1-2. It will be understood by those skilled in the art that the upper concentration limit for the lead acetate corresponds with the upper limit for the ammonium acetate. Reaction is permitted to continue for a time period sufficient to nucleate a film having a thickness within the range of 200-800 angstroms. Deviations from the noted concentrations or pH range fail to result in the nucleation of the desired film.

The next stage of lead dioxide deposition involves the growth of a lead dioxide film upon the previously nucleated film. This end may be attained by (a) exposing the substrate bearing the nucleated film to a solution of the type previously employed and repeating the procedure until a lead dioxide layer of the desired thickness is attained, or (b) utilizing the solution employed previously in the absence of the silver salt and elevating the pH to a value within the range of 10-12, an optimum being found to correspond with a pH of 10.3. The most convenient procedure for attaining this end involves adding ammonium hydroxide to the reaction mixture described above until the desired pH level is attained. Lead dioxide then grows upon the initially nucleated lead dioxide film by a crystal growth mechanism rather than by precipitation, the phenomenon encountered in the nucleation stage. Growth is continued until a lead dioxide film 14, shown in FIG. 3, of the required thickness is obtained. For the purposes of the present invention, it is desirable to grow a film within the range of 4,000-6,000 angstroms. Films less than 4,000 angstroms in thickness are found to be ineffective as a clearing layer in a capacitor, whereas films in excess of 6,000 angstroms are not found to be sufficiently adherent to the substrate member.

In a further alternative technique, this end may be effected by adding a saturated aqueous solution of potassium persulfate to a saturated solution of lead oxide in potassium hydroxide of a molarity ranging from 0.1-2.0.

After obtaining lead dioxide coating 14 of the required thickness, a metallic counterelectrode 15, shown in FIG. 4, is deposited upon and in intimate contact with the lead dioxide layer. A cross-sectional view of the resultant assembly is shown in FIG. 5.

It is to be understood that the procedure delineated hereinabove is given for purposes of illustration only and not for purposes of limitation. A number of variations may be made by one skilled in the art without departing from the spirit and scope of the invention. An example of the present invention is described in detail below.

EXAMPLE

A 1 inch × 3 inch glass substrate bearing a tantalum pentoxide underlay 800 angstroms in thickness was cleaned with ultrasonic detergent washes in accordance with conventional techniques. Thereafter, the substrate was positioned in a cathodic sputtering apparatus, and a layer of tantalum 5,000 angstroms in thickness deposited. Following, a 15-capacitor pattern was etched in the deposited film utilizing conventional photolithographic techniques. Next, the tantalum pattern was anodized in a 0.01 percent aqueous solution of citric acid, a constant current of one milliampere per square centimeter being employed until a voltage of 130 volts was attained. At that point, the assembly was left to anodize for 30 minutes at constant voltage. Following, a film of lead dioxide was nucleated upon the anodized layer by allowing 250 milliliters of a solution comprising 0.3 molar lead oxide dissolved in concentrated ammonium acetate (prepared by mixing 9 parts by volume of 30 percent ammonium hydroxide with 7 parts by volume of glacial acetic acid) to react with one liter of a saturated aqueous solution of ammonium persulfate and $8\times10^{15}$ molar silver nitrate for 60 minutes at room temperature, so resulting in the formation of a lead dioxide coating 400 angstroms in thickness.

Then, the assembly was removed from the coating bath and rinsed in distilled water for 2 minutes. Next, the assembly was immersed in a solution comprising 2 parts by volume of two molar ammonium persulfate, 4 parts by volume of 30 percent ammonium hydroxide and 6 parts by volume of the 0.3 molar lead oxide solution described above. Growth of a lead dioxide film 5,000 angstroms in thickness was then effected over a time period of 40 minutes. Thereafter, the assembly was rinsed in distilled water for 2 minutes and dried at 100° C. for 1 hour in air. Inspection of the resultant lead dioxide film revealed that it was adherent to the substrate member. Finally, a counterelectrode was deposited upon the lead dioxide layer by evaporation of 250 angstroms of a nickel-chromium alloy (80 percent nickel and 20 percent chromium) and 5,000 angstroms of gold. The completed capacitors were found to evidence an average dissipation factor of approximately 0.004 at 1 kilohertz.

For comparative purposes, the procedure described above was repeated with the exception that with a 5,000 angstrom coating of manganese oxide obtained by conventional pyrolytic techniques was employed. The completed capacitors were found to evidence an average dissipation factor of approximately 0.04 at 1 kilohertz. Accordingly, it is evident that the described process results in a significant enhancement in dissipation factor.

In order to demonstrate the adherency of the described films, as compared with lead dioxide films of the prior art, a lead peroxide film was formed on an anodic oxide layer of tantalum, 5,000 angstroms in thickness, by immersion of the anodic oxide layer in a solution of lead tetraacetate in acetic anhydride and subsequent withdrawal of the layer from the solution and hydrolysis of the resultant film by blowing moist air on it. The experiment was repeated 20 times and it was found that the adherency of such films was markedly less than the adherency of the films described herein and that they evidenced a lack of uniformity.

With further reference now to FIG. 6, there is shown a graphical representation on coordinates of dissipation factor against frequency showing variations in dissipation factor for capacitors produced in accordance with the present invention and those wherein the manganese oxide was substituted for the lead dioxide layer. The capacitors compared were of equivalent geometry and included manganese oxide or lead dioxide layers of equal thickness. It is noted by reference to the graph that the dissipation factor of the capacitors of the invention is significantly lower than that of the prior art devices over a frequency range of from 0.1-1,000 kilohertz.

We claim:

1. The process of depositing an adherent layer of lead dioxide on a substrate from a solution containing a divalent lead compound and a persulfate for oxidizing the lead to lead peroxide, characterized in that the surface of the substrate is contacted with said solution having a pH between 5.0 and 6.9 in the presence of silver ions to form an initial deposit of lead dioxide on said surface and is subsequently contacted again with said solution to produce an additional deposit of lead dioxide over said initial deposit.

2. Process in accordance with claim 1 wherein the solution employed to subsequently contact said surface consists essentially of a solution of a divalent lead compound and a persulfate at a pH between 10 and 12.

3. A Process for the fabrication of a solid electrolytic capacitor comprising the steps of (a) partially anodizing a film-forming metal, thereby producing a dielectric oxide layer, and (b) depositing a counterelectrode upon and in intimate contact with said dielectric layer characterized in that there is deposited intermediate said dielectric oxide layer and said counterelectrode, a layer of lead dioxide formed by first nucleating a thin film of lead dioxide upon said dielectric oxide layer by reacting an acidic first solution of ammonium acetate, lead acetate and a soluble silver salt with a compound selected from the group consisting of the persulfates of sodium, potassium and ammonium and then growing a layer of lead dioxide of a thickness within the range of 4,000–6,000 angstroms upon said nucleated layer by reacting a second solution comprising ammonium acetate, lead acetate and a persulfate selected from the group consisting of the persulfates of sodium, potassium and ammonium.

4. Process in accordance with claim 3 wherein said first and second solutions have a pH within the range of 5.0–6.9.

5. Process in accordance with claim 3 wherein said second solution has a pH within the range of 10–12.

6. Process in accordance with claim 3 wherein the molarity of components of said solutions is as follows:

| | |
|---|---|
| ammonium acetate | 1–8 |
| lead acetate | 0.1–1 |
| silver salt | $5 \times 10^{-15} - 5 \times 10^{-14}$ |
| persulfate | 1–2 | the upper limit of concentration of the lead acetate corresponding with the upper limit of concentration of the ammonium acetate.